United States Patent Office 3,761,228
Patented Sept. 25, 1973

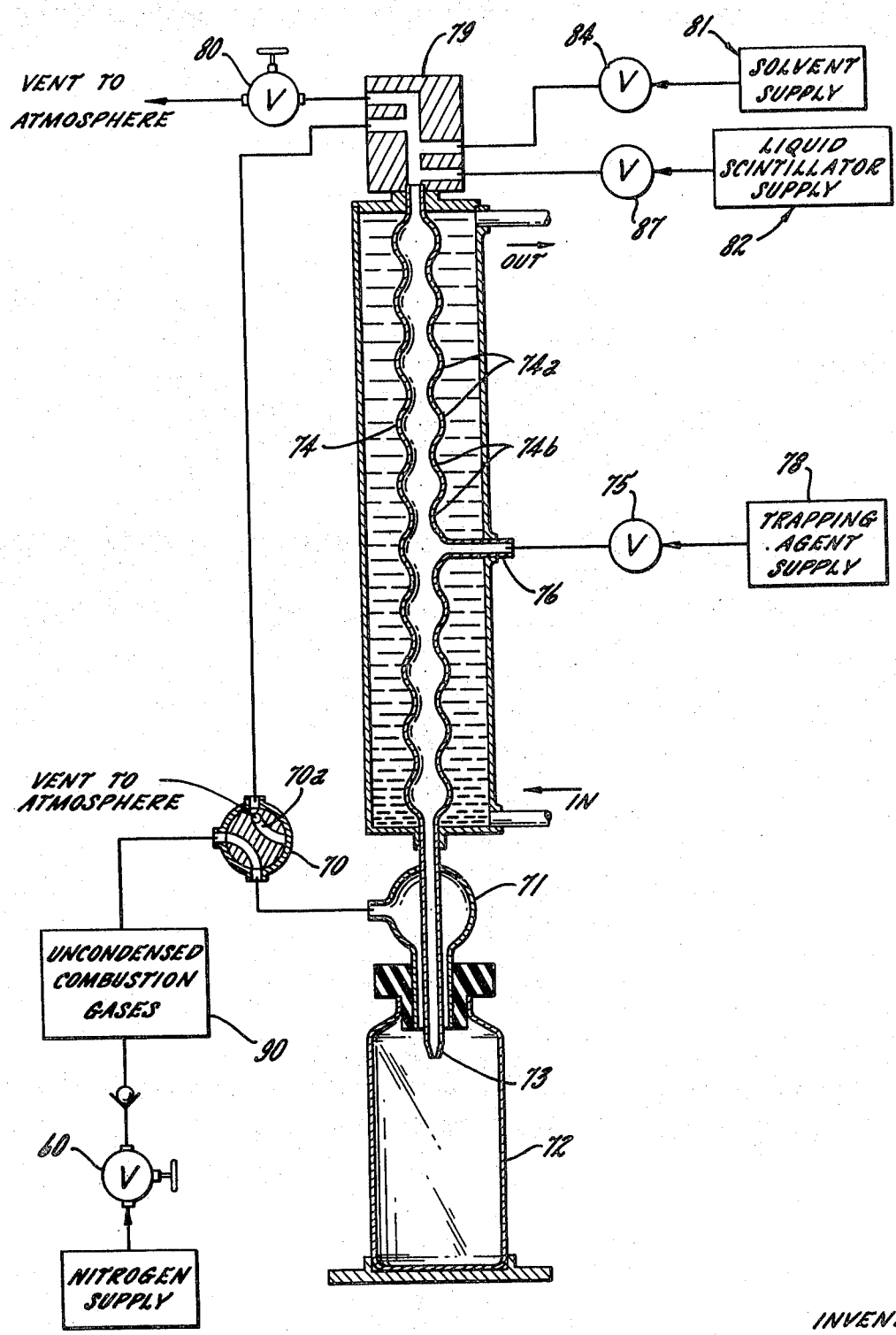

3,761,228
METHOD AND APPARATUS FOR PROVIDING FRACTIONAL INTERACTION BETWEEN GASES AND LIQUIDS
Niilo H. Kaartinen, Turku, Finland, assignor to Packard Instrument Company, Inc.
Continuation-in-part of abandoned application Ser. No. 729,212, May 15, 1968. This application July 27, 1970, Ser. No. 58,635
Int. Cl. G01n 31/06
U.S. Cl. 23—232 R
14 Claims

ABSTRACT OF THE DISCLOSURE

Method and apparatus for the processing of fluid materials, particularly in the preparation of samples for radioactive isotope tracer studies by combustion of starting materials containing such isotope tracers. The sample is burned in a combustion chamber and the combustion products are continuously exhausted from the combustion chamber. Oxygen is fed into the combustion chamber at a controlled rate during combustion, and after combustion nitrogen gas is fed into the combustion chamber and exhausted therefrom through the balance of the system. The radioactive isotope tracer or traces in the gases are trapped in a trapping agent in a column comprising a series of smoothly contoured chambers interconnected by smoothly contoured necked down portions. After all the gases have been passed through the column, the trapped tracers are discharged into a counting vial. A liquid scintillator, and a liquid solvent, if desired are also passed through the column.

CROSS-REFERENCE TO RELATED APPLICATION

This application is a continuation-in-part of my co-pending application Ser. No. 729,212, filed May 15, 1968, and entitled "Gas-Liquid Reaction Column," and now abandoned.

DESCRIPTION OF THE INVENTION

The present invention relates generally to the processing of fluid materials. In its principal application, the invention relates to methods and apparatus for the preparation of samples for radioactive isotope tracer studies and, more particularly, to an improved method and apparatus for preparing such samples by combustion of the starting material containing the isotope tracer.

It is a primary object of the invention to provide an improved method and apparatus for producing fractional interaction between selected gases and liquids at a high speed, and with a high degree of efficiency.

Another important object of the invention is to provide such an apparatus which can be cleaned extremely rapidly and so thoroughly that the apparatus has virtually no memory, even when used with radioactive materials.

A further object of the invention is to provide such a method and apparatus which is capable of recovering over 99% of a selected gas or gases from a rapidly moving gas stream comprising a mixture of gases.

Still another object of the invention is to provide such a method and apparatus which is capable of producing a variety of different fractional gas-liquid interactions, including both chemical and physical reactions, with minimum gas and liquid volumes and maximum output concentration, even when the starting concentrations are very dilute.

It is another object of the present invention to provide an improved gas-liquid reaction column which achieves a high reaction rate between the gas and liquid, and yet can be thoroughly cleaned in a matter of seconds between successive batch-type reactions so that the column has virtually no memory, even when used to react radioactive materials.

A still further object of this invention is to provide such an improved gas-liquid reaction column which, when used for the preparation of samples for radioactive isotope tracer studies, considerably reduces the sample preparation time, with corresponding increases in the same preparation rate.

A more specific object of the invention is to provide such an improved gas-liquid reaction column for recovering $^{14}C$ gas by chemical reaction with a trapping agent, and which provides extremely high recovery efficiencies.

Another object of the invention is to provide an improved method and apparatus for recovering tritiated water vapor from a stream of combustion gases, using distilled water as the trapping agent. In this connection, a related object is to provide such a method and apparatus which is extremely rapid, which recovers over 99% of the tritiated water vapor, and which can be thoroughly cleaned in a matter of seconds so that the apparatus has virtually no memory.

Other objects and advantages of the invention will become apparent from the following detailed description and upon reference to the accompanying drawings, in which the single figure is a sectional elevation view of a reaction column for use in the preparation of samples for radioactive isotope tracer studies, and including a schematic diagram of a portion of the fluid system associated therewith.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention.

Turning now to the drawing, there is illustrated a portion of a sample preparation system for use in the preparation of samples for radioactive isotope tracer studies, such as studies involving tissue distribution and residue levels of drugs in plants and animals. In the preparation of such samples, a sample of the starting material containing the radioactive isotope tracer, such as a sample of the plant or animal tissue, is burned to convert the carbon in the starting material to carbon dioxide and the hydrogen to water, and the radioactive isotope tracer is then recovered from the resulting combustion products. For example, if the particular radioactive isotope tracer employed is $^{14}C$, it appears in the combustion products as $^{14}CO_2$ gas; if the tracer is tritium ($^3H$), it appears in the combustion products as $^3H_2O$ in the form of a condensable vapor. Although $^{14}C$ and $^3H$ are the most commonly employed tracers, it will be understood that a number of other radioactive isotopes may be employed, such as $^{35}S$ which is converted to sulfate during combustion.

In order to provide samples which can be analyzed for radioactivity, the compounds containing the isotope tracers are recovered from the combustion products, and separated from any materials therein which might interfere with the radioactivity determination. For example, the $^3H_2O$ may be recovered by cooling the combustion products to condense the vapors therein, including the $^3H_2O$, after which the condensed vapors are separated from the remaining gases. The $^{14}CO_2$ may also be recovered by condensation or freezing at extremely low temperatures, such as by the use of liquid nitrogen for example, but it is more conventional to react the $^{14}CO_2$ with a liquid trapping agent such as ethanolamine; the resulting reaction product is then recovered and mixed with a liquid scintillator to provide a sample suitable for use in making a radioactivity determination.

To prepare a sample of the type described above, the starting material is initially placed in a combustion chamber and ignited to produce gaseous combustion products which are discharged from the combustion chamber and passed through means for recovering the radioactive isotope tracer such as tritium in the form of $^3H_2O$ and/or $^{14}C$ in the form of $^{14}CO_2$ gas. In the accompanying drawing, the source of uncondensed combustion gases has been indicated generally by the reference numeral 90, without showing the specific equipment for producing such gases. After the combustion of a given sample has been completed, a valve 60 is opened to supply an inert gas such as nitrogen to the combustion chamber and the recovery equipment so as to purge the system of any remaining combustion products, and this inert purging gas then follows the combustion gases through the balance of the system shown in the drawing.

In accordance with the present invention, fractional interaction between the combustion gas stream and a recovery liquid is effected by passing the gas stream through a fluid passageway having a central unobstructed longitudinal opening therethrough and having a series of enlarged bulbous chambers, each adjacent pair of which are interconnected by a necked down portion of the passageway with the interconnecting walls of the chambers and the necked down portions forming a smooth curvilinear configuration; and distributing the recovery liquid along the length of the fluid passageway while the gas stream is flowing therethrough so that the liquid is effectively mixed with the gas stream flowing therethrough, whereby fractional interaction between the gas and liquid is effected along the length of the fluid passageway. Although it will be understood that there are many different uses for the method and apparatus of this invention, it will be described first in an exemplary arrangement adapted to recover $^{14}CO_2$ gas from a stream of combustion gases from the source 90. Thus, in the illustrative system, the uncondensed combustion gases from the source 90 are passed through a valve 70 which, when in the position shown in the drawing, conducts the gases through a connector 71 into a sample vial 72. From the sample vial 72, the gases enter the lower end of a depending stem 73 of a column 74 comprising a series of smoothly contoured bulbous chambers 74a interconnected by smoothly contoured necked down portions 74b with the interconnecting walls of the chambers 74a and the necked down portions 74b forming a smooth curvilinear configuration.

Just after the gas flow through the column 74 is initiated, a valve 75 is turned 90° from the position shown in the drawing so as to feed a preselected amount of liquid trapping agent from a supply 78 into an inlet stem 76 in the middle of the reaction 74; alternatively, the liquid trapping agent may be fed into the top or any other desired point of the column 74. When the liquid is fed into the column 74 in the illustrative arrangement, there must be a sufficient gas flow through the column 74 to retain the liquid within the column, i.e., to prevent the liquid from flowing downwardly through the stem 73 into the vial 72. In a typical sample preparation process, this initial gas flow may be provided by the oxygen that is passed through the sample combustion chamber just prior to ignition of the sample.

When the combustion gases containing the $^{14}CO_2$ enter the column 74, the liquid trapping agent must be uniformly distributed throughout the various bulbous chambers 74a, and such distribution must be maintained as long as the combustion gases flow through the column 74. The distribution of the liquid trapping agent throughout the column 74 may be achieved by increasing the gas flow rate sufficiently to sweep the liquid upwardly through the column, and thereafter maintaining the gas flow rate, including the flow rate of the combustion gases, at a level sufficient to maintain the desired liquid distribution. That is, the upward gas flow through the column 74 distributes the liquid trapping agent along the walls of the bulbous or enlarged reaction chambers 74a while preventing the trapping agent from flowing down through the elongated depending stem 73 at the bottom of the reaction column, so that no liquid trapping agent enters the vial 72.

As the gases containing the radioactive isotope tracer, such as $^{14}CO_2$ for example, are passed upwardly through the reaction column, the radioactive compound is chemically reacted with the trapping agent, such as ethanolamine for example, fractionally along the length of the column 74 to form a reaction product which is held within the reaction chambers 74a along with the liquid trapping agent. The amount of reaction product contained in the series of reaction chambers 74a varies along the length of the reaction column, but it has been found that the reaction effected by the particular reaction column configuration provided by this invention traps over 99% of the isotope tracer. The unreacted gases are exhausted from the upper end of the reaction column through a connector member 79 and vented to the atmosphere through a valve 80.

To control the reaction temperature within the column 74, a heat transfer fluid is passed through an annular jacket surrounding the column 74. In this connection, it has been found that the reaction column provided by this invention provides effective heat transfer with a high degree of efficiency when used to carry out gas-liquid reactions. It is believed that the interaction of the upwardly flowing gas with the liquid that is held within the enlarged reaction chambers 74a brings all portions of the liquid into intimate contact with the column walls, thereby effecting efficient heat transfer between the liquid and the column walls.

After the sample combustion has been completed, the flow of nitrogen is continued for a suitable purging period, e.g., 30 seconds, and the valve 70 is then turned 90° so as to conduct the purging nitrogen gas into the upper end of the reaction column 74, thereby effecting a reversal of the direction of gas flow through the column. As the gas flows downwardly through the reaction column 74, it sweeps the liquids contained therein, including the reaction product formed by reaction of the isotope tracer with the trapping agent, into the sample vial 72. The gases are discharged from the vial 72 upwardly through the connector 71 and vented to the atmosphere through the valve 70 via passageway 70a therein.

The valve 70 is then returned to its original position to resume the gas flow upwardly through the reaction column, and the connector 79 at the upper end of the reaction column 74 may be sequentially connected to a pair of liquid supply systems generally indicated at 81 and 82. The first supply system 81 contains a liquid solvent to be used to dissolve the reaction product formed by reaction of the isotope compound with the trapping agent; the solvent may also serve to maintain the resultant sample in a liquid condition where it is to be handled at subfreezing temperatures. When the valve 84 is opened, this liquid flows downwardly into the reaction column 74 and is distributed therethrough in the same manner described previously for the liquid trapping agent supplied through the inlet stem 76. It has been found that the combination of the upward gas flow and the liquid input at the top of the column, provides a scrubbing action on the inside walls of the reaction column so that substantially all the reaction product contained therein is recovered in the sample vial 72. In fact, it has been found that the recovery effected by this reaction column is so efficient that it has substantially no memory whatever, and over 99% of the isotope tracer is recovered in the vial 72.

After the first liquid has been dispensed into the top of the reaction column, the nitrogen flow is continued upwardly through the column for a period of about 15 to 45 seconds, depending upon the concentration of $CO_2$ relative to the trapping agent. The valve 70 is then again turned 90° to reverse the gas flow through the reaction column, thereby sweeping the liquid solvent downwardly through the reaction column into the sample vial 72. The valve 70 is then again returned to its original position so that the inert gas once again flows upwardly through the reaction column, and the liquid scintillator is metered into the upper end of the reaction column from the second liquid supply system 82 by opening the valve 87. Due to the upward gas flow through the reaction column, this liquid again provides a scrubbing action on the walls of the reaction column 74. After the liquid has been dispensed into the column, the upward nitrogen flow is continued for about 5 to 10 seconds, at which time the gas flow is again reversed in the column 74, by turning the valve 70, to discharge the liquid scintillator into the vial 72. In addition to providing a convenient means of admitting the liquid scintillator into the vial 72, the liquid supply systems associated with the reaction column 74 provide a rapid and efficient means of achieving recoveries in excess of 99% with attendant low memories of 1/1000 or less. Moreover, it will be appreciated that the isotope tracer is passed through only a single valve 70, thereby further facilitating complete recovery of the radioactive tracer.

In one example of the aforedescribed exemplary embodiment, 300 milligrams of double-labelled ($^3$H and $^{14}$C) material were placed in the combustion chamber and burned with an oxygen flow rate initially set at about 0.1 liter per minute. Immediately after the oxygen was turned on, i.e., after initiation of gas flow through the reaction column 74, 2.7 milliliters of ethanolamine (trapping agent) were manually injected into the reaction column. After the ethanolamine was injected into the reaction column, the oxygen feed rate was gradually increased to one liter per minute, and at the same time the pressure in the gas feed line to the reaction column was increased by turning the valve in the atmosphere vent toward the closed position until the pressure reached 0.3 atmosphere above atmospheric pressure. At this point, the sample was ignited in the combustion chamber. A white flame was initially produced due to the burning of hydrogen (which burns more rapidly than the carbon and produces a white flame). As this white flame began to diminish, the oxygen flow rate was gradually decreased to about 0.3 liter per minute to complete the combustion of the carbon. The exhaust gases from the combustion chamber were initially rich in water due to the combustion of the hydrogen, and subsequently became richer in carbon dioxide due to the combustion of the carbon. The water was condensed and collected in a first counting vial, while the $CO_2$ gas was passed on to the reaction column containing ethanolamine as a trapping agent; as the $CO_2$ passed upwardly through the reaction column, it reacted with the ethanolamine to form a carbamate reaction product. After the combustion was completed, the oxygen was turned off and the nitrogen turned on at a flow rate of 0.3 liter per minute and maintained for about 15 seconds to purge the system of gaseous combustion products. With the nitrogen flow continuing, the valve 70 connected between the first vial and the reaction column was turned to its second position so that the nitrogen flow was fed into the top of the reaction column rather than the bottom, thereby reversing the nitrogen flow through the column to sweep the liquid reaction product, as well as any unreacted trapping agent, downwardly through the reaction column and into the second counting vial. The excess gases were discharged through the connector 71 and the valve 70. After the reaction product was collected in the second counting vial, the valve 70 was returned to its original position, and with the nitrogen flow rate being maintained at about 0.3 liter per minute, the liquid solvent valve was opened to feed a preselected quantity of liquid solvent into the reaction column. As this liquid passed downwardly through the column, the upwardly passing nitrogen gas coacted with the downwardly flowing liquid to create a turbulent condition within the reaction column. The nitrogen flow was maintained for 15 seconds and then again switched to the top of the reaction column so as to sweep the liquid downwardly through the column and into the counting vial. At this point, the valve 70 was returned to its original position so that the nitrogen flow once again entered the bottom of the column and flowed upwardly therethrough. At the same time, the valve associated with the liquid scintillator supply system was opened to feed a preselected metered amount of liquid scintillator into the top of the reaction column in the same manner described previously for the liquid solvent, except that the nitrogen flow was maintained for only 5 seconds, after which the valve 70 was again switched to its second position to conduct the nitrogen into the top of the column and sweep the liquid down into the counting vial. The nitrogen flow rate was then increased to a level of four liters per minute, and the counting vial 72 was removed from its stopper and tilted thereunder to purge the vial headspace. At this point, the nitrogen was shut off and the sample preparation procedure was complete. The amount of liquid solvent fed into the reaction vessel was eight milliliters, and the amount of liquid scintillator was the same. The total sample preparation for this double-labelled sample was such that 10 to 15 samples could be prepared per hour. The counting efficiency was 70%, the recovery was in excess of 99%, the standard deviation of recovery was 0.9%, and the memory was a maximum of 1/1000. The background was 37, so that the figure of merit was 133.

Another useful application of the present invention is in the recovery of tritiated water vapor from a stream of combustion gases resulting from the combustion of a $^3$H-labelled sample. In this case, the trapping liquid that is fed into the recovery column 74 is preferably distilled water; it has been found that the tritiated water vapor displaces the distilled water in the bulbous chambers 74a fractionally along the length of the column 74, and that over 99% of the tritiated water vapor in the gas stream can be replaced by the distilled water. That is, tritiated water vapor enters the column, but substantially all the water vapor discharged from the column is ordinary distilled water, i.e., not tritiated. Fractions of other gases contained in the gas stream, e.g., oxygen and carbon dioxide, are also collected in the distilled water, but these gases can be removed from the distilled water by passing nitrogen gas through the column for a brief interval following termination of the flow of combustion gases therethrough. The nitrogen displaces the oxygen and carbon dioxide much more rapidly than it displaces the tritiated water vapor, so that the liquid remaining in the chambers 74a after a selected nitrogen-purging period consists essentially of distilled water, tritiated water, and nitrogen. The liquid may then be removed from the column by flushing with a small amount of liquid, e.g., distilled water, (supplied via valve 84 in the same manner as the liquid solvent 81 described above), or by flushing with an inert gas, e.g., nitrogen; in general, higer flow rates are required when flushing with gas, as compared with liquid flushing.

In an example of the use of the invention to recover $^3$H, a stream of radioactive gas was passed through two glass columns in series, each column having the general configuration of the column 74 illustrated in the drawing with a 0.136" maximum inside diameter in the chambers 74a, a 0.076" minimum inside diameter in the restrictions 74b, and having 59 chambers 74a spaced at a pitch of about 0.2" center-to-center. The total length of each column was 300 mm. Before initiating the flow of gas through the column, 0.140 ml. of distilled water was injected into each column, and 5 liters of nitrogen gas containing 150,000 c.p.m. of tritium was passed through the columns in series at a rate of 1 liter per minute. The radioactive gas was saturated with water vapor, and at 23° C. the 5 liters of gas contained 0.1 ml. of water vapor. During the passage of the 5 liters of gas through the two columns, 0.1 ml. of water vapor left the first column and entered the second column, and 0.1 ml. of water vapor exited to vent from the second column. The water remaining in the two columns was then transferred to counting vials, and it was found that the water in the second column had only 90 c.p.m. of activity, or only 0.06% of the total activity fed into the two columns. The remainder of the activity was recovered in the first column.

One significant advantage of the present invention is that the configuration and dimensions of the column 74, the flow rate of the gas, and the nature of the liquid can be selected so that the trapping liquid can be distributed and maintained throughout all the chambers 74a regardless of the orientation of the column 74 relative to gravitational forces. Consequently, the column can be disposed at any desired angle without adversely affecting its operation. One example of this type of design is given in the foregoing example relating to the recovery of tritiated water; the column used in that example could be operated vertically, horizontally, or at any other desired angle without adversely affecting the results obtained.

While it is not intended to limit the invention to any particular theory, it is believed that the gas stream is attracted to the walls of the column 74 as it passes through each restriction 74b, thereby maintaining the liquid on the walls of the chambers 74a and becoming intimately mixed therewith. It is believed that equilibrium between the gas and liquid phases is thus achieved extremely rapidly, with a fraction of the gas phase being retained in the liquid on the walls of each successive chamber 74a, and a corresponding fraction of the liquid being entrained in the gas stream. For example, when the invention is utilized to remove tritiated water vapor from a gas stream, a fraction of the tritiated water vapor is retained in the liquid in each chamber 74a, along with fractions of the other gases in the stream, and a fraction of the distilled water from the walls of the column 74 is entrained in the gas stream. As mentioned previously, it has been surprisingly found that virtually all the tritiated water vapor can be removed from a typical stream of combustion gases resulting from the combustion of a $^3$H-labelled sample in a relatively short column. This remarkable total recovery is believed to be explained by the following mathematical analysis:

Assume a series of interconnected vessels, corresponding to the chambers 74a, each containing A grams of water; the molal fraction of tritiated water in any vessel is $X_i$; there is no dead space in the vessels, gas flow through the series of vessels is B ml./min.; the gas is saturated with water vapor amounting to F gm./ml.; and the molal fractions $X_i$ are very small. Then the molal fraction tritiated water in the $i^{th}$ vessel is $X_i$, and the quantity of that fraction in mols is:

$$M_i = \frac{X_i}{20X_i + (1-X_i)18} A \approx \frac{X_i}{18} A$$

Further assuming the amount of water vapor entering a vessel is equal to the amount of water vapor leaving the vessel, in time $dt$ the amount of tritiated water entering a vessel is $$X_{i-1} \frac{FBdt}{18}$$

mols and the amount leaving the vessel is $$X_i \frac{FBdt}{18}$$

mols. The net increase is therefore:

$$dM_i = FB(X_{i-1} - X_i) \frac{dt}{18}$$

On the other hand:

$$dM_i = A \frac{dX_i}{18}$$

so $$\frac{dX_i}{dt} = \frac{FB}{A}(X_{i-1} - X_i)$$

Let $$K = \frac{FB}{A}$$

then $$\frac{dX_i}{dt} + KX_i = KX_{i-1}$$

Taking the Laplace transform of both sides, $$sL\{X_i\} - X_i(O) + KL\{X_i\} = KL\{X_{i-1}\}$$

The molal fraction $X_i$ at the time $t=0$ is assumed to be zero, so $$LX_i = \frac{K}{s+K} L\{X_{i-1}\}$$

From this recursion formula one gets:

$$L\{X_i\} = \left(\frac{K}{s+K}\right)^i L\{X_0\}$$

From the above a general solution follows expressed in terms of a function $X_0(t)$ for any time as a convolution integral $$X_i(t) = \frac{1}{(i-1)!} \int_0^{Kt} X_0(t - u/K) u^{i-1} e^{-u} du$$

If $X_0$ is a constant, it is possible to express the solution by means of a gamma function:

$$X_i(t) = X_0 P(i, Kt)$$

$$X_i(t) = X_0 \left(1 - e^{-Kt} \sum_{n=0}^{i-1} \frac{(Kt)^n}{n!}\right)$$

The solution can also be obtained from a recursion formula $$X_1(t) = X_0(1 - e^{-Kt}); \quad X_i(t) = X_{i-1}(t) - (kt)^{i-1} e^{-Kt} X_0 / (i-1)!$$

When the final equation of the analysis is solved for $X_i$ it is possible to determine the distribution of the tritiated water in the various vessels of the column. It is then possible to determine the number of vessels required to trap as large a percentage of tritiated water as desired in a pre-selected period of time. The period of time is determined from sample size and the flow rate of combustion gases; being the time required for the total volume of gases generated during combustion to flow through the column at the flow rate for which the equipment is adjusted.

The above analysis applies to the idealized case. In actual practice an experimental coefficient must be determined. The coefficient is a function of the flow rate, the volume of one of the bulbous sections, the volume of liquid stored in the column, the viscosity of the liquid, and the temperature of the column. The coefficient approaches unity as the average distance between the gas and liquid molecules approached zero. The lowest value of the coefficient obtained in the specific exemplary embodiment described above was 1.3. This procedure can be used for the optimization of the performance characteristics of any gas-liquid interaction within this type of column.

I claim as my invention:

1. A method of effecting fractional gas-liquid interactions comprising providing an elongated fluid passageway of circular cross-section having openings formed in the end extremities thereof; said passageway having a central unobstructed longitudinal opening therethrough and comprising a series of enlarged bulbous chambers each adjacent pair of which are interconnected by a necked down portion of the passageway with the interconnecting walls of said chambers and said necked down portions forming a smooth curvilinear configuration; feeding a batch of liquid of predetermined size into the fluid passageway; passing a gas stream longitudinally through said fluid passageway from one of said end openings to the other whereby the liquid in the column is distributed in the chambers along the length of the column, is disposed between the end extremities of the column, and is effectively mixed with the gas passing through the column so that fractional interaction takes place between the liquid and the gas; and then passing a fluid through said passageway to remove said liquid therefrom.

2. A method as set forth in claim 1 wherein the configuration and dimensions of said fluid passageway, the flow rate of said gas stream, and said liquid are selected to maintain said liquid on the walls of said chambers as long as said gas stream is flowing therethrough, regardless of the orientation of said fluid passageway relative to gravitational forces.

3. A method as set forth in claim 1 wherein said gas stream is a stream of combustion gases containing tritiated water vapor and said liquid is distilled water.

4. A method as set forth in claim 3 wherein an inert purging gas is passed through said passageway for a predetermined time after termination of the flow of said combustion gas stream therethrough, whereby said purging gas displaces gases other than the tritiated water vapor from said distilled water.

5. A method as set forth in claim 4 wherein said inert purging gas is nitrogen.

6. Apparatus for effecting gas-liquid interactions comprising an elongated column of circular cross-section having openings formed in the end extremities thereof, means for feeding a batch of liquid of predetermined size into said column, means for passing gas longitudinally through said column from one of said end openings to the other whereby said liquid batch is distributed along the length of said column and is disposed between the end extremities thereof, said reaction column having a central unobstructed longitudinal opening therethrough and comprising a series of smoothly contoured bulbous chambers each adjacent pair of which are interconnected by a smoothly contoured necked down portion with the interconnecting walls of said chambers and said necked down portions forming a smooth curvilinear configuration whereby the liquid in the column is distributed in the chambers and is effectively mixed with the gas passing through the column so that fractional interaction takes place between the liquid and the gas along the length of the column, and means for reversing the direction of said gas flow through said column for discharging said liquid from the column.

7. Apparatus as set forth in claim 6 further characterized by the inclusion of means for supplying a second liquid to said column whereby gas flow through said column effects a scrubbing action of said liquid and gas on the walls of said column.

8. Apparatus as set forth in claim 6 further characterized by means for connecting a sample vial to the liquid discharge end of said column for receiving the liquids removed from said column whereby gas flowing through said column during the liquid removal may be used to purge the headspace of said vial.

9. Apparatus as set forth in claim 6 further characterized by the inclusion of means for supplying an inert gas to said column for purging the column upon completion of the liquid-gas interaction therein.

10. An improved method for effecting gas-liquid reactions comprising providing an elongated column of circular cross-section having openings formed in the end extremities thereof, said column having a central unobstructed longitudinal opening therethrough and comprising a series of smoothly contoured reaction chambers each adjacent pair of which are interconnected by a smoothly contoured necked down portion of the column with the interconnecting walls of said chambers and said necked down portions forming a smooth curvilinear configuration, feeding a batch of liquid reactant of predetermined size into said column, passing gas through the column in a first direction so that the liquid is distributed along the length of the column in the reaction chambers and effectively mixed with the gas flowing therethrough to effect a reaction therebetween, and reversing the direction of said gas flow through said column so as to discharge said liquid and the reaction product from said column.

11. An improved gas-liquid reaction method as set forth in claim 10 further characterized in that the gas passed through said column contains a radioactive isotope tracer, and the liquid fed into said column for reaction with said gas is a liquid trapping agent.

12. An improved gas-liquid reaction method as set forth in claim 10 further characterized in that upon completion of the gas-liquid reaction, a second liquid is fed into said column while passing a inert gas through the column in said first direction so as to remove any residual reaction product from the walls of said column, and the direction of the flow of said inert gas through said column is reversed so as to discharge the liquid and any remaining reaction product from the column.

13. An improved gas-liquid reaction method as set forth in claim 12 further characterized in that said second liquid is solvent for said reaction product.

14. An improved gas-liquid reaction method as set forth in claim 12 further characterized in that said second liquid is a liquid solvent for said reaction product and a third liquid comprising a liquid scintillator is subsequently supplied to said column while passing inert gas through the column in said first direction, after which the direction of the flow of the inert gas through the column is reversed so as to discharge the liquid scintillator from the column.

References Cited
UNITED STATES PATENTS 2,356,530   8/1944   Pflock _____ 261—112 X MORRIS O. WOLK, Primary Examiner
R. M. REESE, Assistant Examiner U.S. Cl. X.R.

23—254 R, 259, 292; 261—112